United States Patent

Moon

(10) Patent No.: US 9,612,175 B2
(45) Date of Patent: Apr. 4, 2017

(54) METHOD AND SYSTEM FOR SETTING OFFSET OF OIL PRESSURE SENSOR

(71) Applicant: Hyundai Motor Company, Seoul (KR)

(72) Inventor: Seongwook Moon, Seoul (KR)

(73) Assignee: Hyundai Motor Company, Seoul (KR)

( * ) Notice: Subject to any disclaimer, the term of this patent is extended or adjusted under 35 U.S.C. 154(b) by 473 days.

(21) Appl. No.: 14/108,850

(22) Filed: Dec. 17, 2013

(65) Prior Publication Data

US 2014/0331739 A1 Nov. 13, 2014

(30) Foreign Application Priority Data

May 9, 2013 (KR) .......................... 10-2013-0052730

(51) Int. Cl.
*G01L 27/00* (2006.01)
*G01L 19/02* (2006.01)

(52) U.S. Cl.
CPC ................................ *G01L 19/02* (2013.01)

(58) Field of Classification Search
None
See application file for complete search history.

(56) References Cited

U.S. PATENT DOCUMENTS

| 5,457,631 A | 10/1995 | Momose |
| 2011/0040463 A1* | 2/2011 | Moses et al. .................. 701/63 |

FOREIGN PATENT DOCUMENTS

| JP | 2010-143365 A | 7/2010 |
| KR | 10-2002-0033768 A | 5/2002 |
| KR | 10-0941239 | 9/2009 |
| KR | 10-2012-0050846 | 5/2012 |
| KR | 10-2012-0131609 A | 12/2012 |

* cited by examiner

*Primary Examiner* — Robert R Raevis
(74) *Attorney, Agent, or Firm* — Mintz Levin Cohn Ferris Glovsky and Popeo, P.C.; Peter F. Corless

(57) ABSTRACT

A technique for setting offset of a hydraulic pressure sensor which senses operation oil pressure is provided herein. In particular, ignition-off is detected and an ignition-off time point and remaining pressure of the object to be sensed are stored. The remaining pressure is sensed by the hydraulic pressure sensor at the ignition-off time point and stored accordingly. Additionally, whether an ignition is turned on or not after the ignition-off is also detected and an ignition-on time point is stored, when the ignition-on is detected after the ignition-off. A time lapse between the ignition-on from the ignition-off time point is then calculated along with the reduced pressure corresponding to the time lapse due to the time lapse. As a result, a value obtained by subtracting the reduced pressure from the remaining pressure of the hydraulic pressure sensor is set and applied as the offset of the hydraulic pressure sensor.

8 Claims, 6 Drawing Sheets

METHOD AND SYSTEM FOR SETTING OFFSET OF OIL PRESSURE SENSOR

CROSS-REFERENCE TO RELATED APPLICATION

This application claims priority to and the benefit of Korean Patent Application No. 10-2013-0052730 filed in the Korean Intellectual Property Office on May 9, 2013, the entire contents of which are incorporated herein by reference.

BACKGROUND OF THE INVENTION (a) Field of the Invention

The present invention relates to a method and a system for setting offset of a hydraulic pressure sensor which senses hydraulic operating pressure in a device (for an example, an engine clutch) using hydraulic pressure (oil pressure).

(b) Description of the Related Art

Many powertrain components such as transmissions and clutches utilize hydraulic pressure to operate and thus typically also utilize a sensor that is configured to sense hydraulic operating pressure. These components are used universally in all types of motor vehicles and are not limited to one particular vehicle type.

In particular, hybrid vehicles (i.e., vehicles that use two or more power sources, such as an electric motor and an engine. Referring to FIG. 1, the hybrid vehicle typically has an engine 10, a motor 20, and a transmission 40 arranged on a line. The hybrid vehicle 1 includes an ISG (Integrated Starter & Generator) 70 which is utilized to start the engine 10 or generate electricity from torque of the engine 10 and an engine clutch 30 which connects/disconnects power between the engine 10 and the motor 20.

The engine clutch 30 plays a substantially important role in the hybrid vehicles by appropriately combining the power from the engine 10 and the motor 20 in order to operate the hybrid vehicle. As such, FIG. 2 illustrates a conceptual view of a configuration of an example of the engine clutch 30.

Referring to FIG. 2, the engine clutch 30 includes: a friction material 36 movable by pressure (i.e., the hydraulic pressure) of a fluid (e.g., oil) 34 of which flow rate is controlled by operation of a hydraulic oil pump 50 (or a solenoid valve) and a return spring 32 which forces the friction material 36 to return to its original position when the hydraulic operating pressure is not being applied to the friction material 36. Typically in configurations like the one described above, the hydraulic oil pump 50 is controlled by a voltage and/or a current.

The hydraulic pressure (oil pressure) actually applied to the engine clutch 30 from the hydraulic oil pump 50 is sensed by the hydraulic pressure sensor 80. However, as shown in FIG. 3, an error can occur between an actual pressure sensed by the hydraulic pressure sensor 80 and an ideal pressure owing to the voltage applied to the hydraulic oil pump 50.

The error shown in FIG. 3 may include an offset error, a gain error, and/or a linearity error. As shown, the offset error typically causes an error in the hydraulic pressure sensed by the hydraulic pressure sensor 80 in a range of, for example, about +0.2 bar--0.2 bar.

Because the pressure sensed by the hydraulic pressure sensor 80 plays an important role in control of the engine clutch 30, drivability of the vehicle may be adversely affected, unless the hydraulic pressure sensor 80 is appropriately calibrated, and particularly, the offset of the hydraulic pressure sensor 80 is appropriately corrected.

In the related art, the offset correction of the hydraulic pressure sensor executed after a predetermined period of time has passed. That is, in the related art, as a countermeasure to excess pressure—in the engine clutch 30, a processes is executed that determines that the pressure in the engine clutch 30 is dispersed when about five minutes of soaking time is passed the offset correction of the hydraulic pressure sensor is performed.

Accordingly, in the related art, when the soaking time is less than a predetermined period of time (e.g., five minutes), since the control is performed by sensing the hydraulic pressure of the engine clutch based on a previous offset, a control error is generated, which may deteriorate drivability.

A soaking time is defined as a period of time from ignition off to ignition on in this field of art.

Description of the Related Art is made to help understanding the background of the present invention and may include matters which are not the related art known to those skilled in this field of art.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and a system for setting offset of a hydraulic pressure sensor having advantages of being not influenced by remaining pressure and soaking time, in which offset of a hydraulic pressure sensor is set by setting offset (remaining pressure–reduced pressure) of the hydraulic pressure based on the remaining pressure of an object to be sensed (e.g., the engine clutch) sensed by the hydraulic pressure at the time of ignition off and the reduced pressure in the period of time from the ignition off to the ignition on, for preventing soaking time and a remaining pressure period from affecting the offset of the hydraulic sensor.

An exemplary embodiment of the present invention provides a method of setting an offset of a hydraulic pressure sensor which senses hydraulic pressure of an object to be sensed. In particular, ignition-off is detected and an ignition-off time point and remaining pressure of the object to be sensed are stored. The remaining pressure is sensed by the hydraulic pressure sensor at the ignition-off time point and stored accordingly. Additionally, whether an ignition is turned on or not after the ignition-off is also detected and an ignition-on time point is stored, when the ignition-on is detected after the ignition-off. A time lapse between the ignition-on from the ignition-off time point is then calculated along with the reduced pressure corresponding to the time lapse due to the time lapse. As a result, a value obtained by subtracting the reduced pressure from the remaining pressure of the hydraulic pressure sensor is set and applied as the offset of the hydraulic pressure sensor.

The reduction pressure may be obtained by multiplying a pressure reduction amount per a time period in a mapping table, which is determined and stored in advance, by the lapse time.

In some exemplary embodiments of the present invention, the ignition-off time point may be stored in a non-volatile memory by using battery power. Furthermore, the object to be sensed may be an engine clutch that connects/disconnects power between an engine and a motor in a hybrid vehicle.

Another exemplary embodiment of the present invention provides a system for setting offset of a hydraulic pressure in accordance with another exemplary embodiment of the present invention for sensing hydraulic pressure of an object to be sensed. In particular, the system includes an ignition power source that supplies power to enable a vehicle to run; a hydraulic oil pumps that supplies hydraulic pressure to the object to be sensed; a battery that provides back up power t to the system; and a hydraulic pressure sensor offset setting controller that sets offset of the hydraulic pressure sensor based on the remaining pressure of the object to be sensed and a lapse of time from ignition-off to ignition-on.

The hydraulic pressure sensor may be operated by a program installed to perform a method of setting offset of a hydraulic pressure sensor according to an exemplary embodiment of the present invention.

The hydraulic pressure sensor offset setting controller may include an ignition-on/off detector for detecting ignition-on or ignition-off; a lapse time calculator/processor that is configured to calculate the lapse time to ignition-on from ignition-off; a storage unit configured to store a mapping table including the remaining pressure of the object to be sensed in ignition-off, an ignition-off time point and an ignition-on time point detected by the ignition-on/off detector, the lapse time calculated by the lapse time calculator/processor, and a predetermined pressure reduction amount over a time period; a reduced pressure calculator that is configured to calculate the reduced pressure corresponding to the time lapse based on the pressure reduction amount over a–period of time; an offset setting unit configured to set an offset of the hydraulic pressure sensor based on the reduced pressure and the remaining pressure; and a processor configured to control and execute the above units.

As described above, according to an exemplary embodiment of the present invention, it is possible to set offset of a hydraulic pressure sensor without being the sensor being influenced by soaking time and remaining pressure by setting offset i.e., remaining pressure–reduction pressure) of the hydraulic pressure sensor based on the remaining pressure of an object to be sensed (e.g., engine clutch) sensed by the hydraulic pressure sensor during ignition-off and the reduction pressure corresponding to the lapse time to the ignition-on from the ignition-off.

According to an exemplary embodiment of the present invention, since it is possible to make stabilize the setting of an offset of a hydraulic pressure sensor, it is possible to prevent deterioration of drivability relating to, for example, engine clutch control in the hybrid vehicle.

DETAILED DESCRIPTION OF THE EMBODIMENTS

Figure 1:
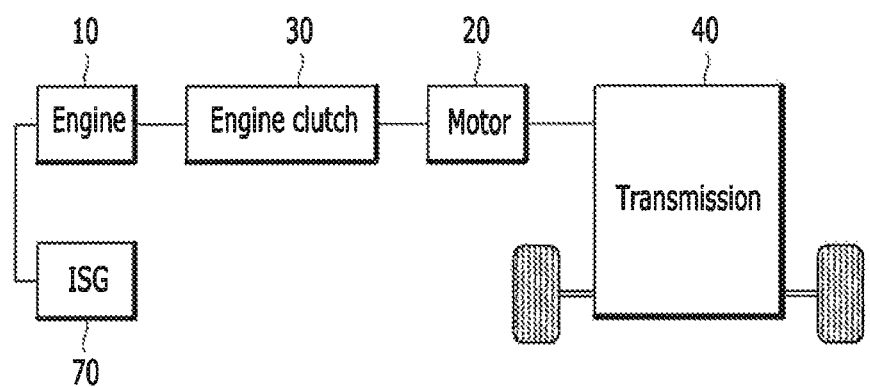
FIG. 1 is a schematic view illustrating a configuration of an example of a related art hybrid vehicle.
Figure 2:
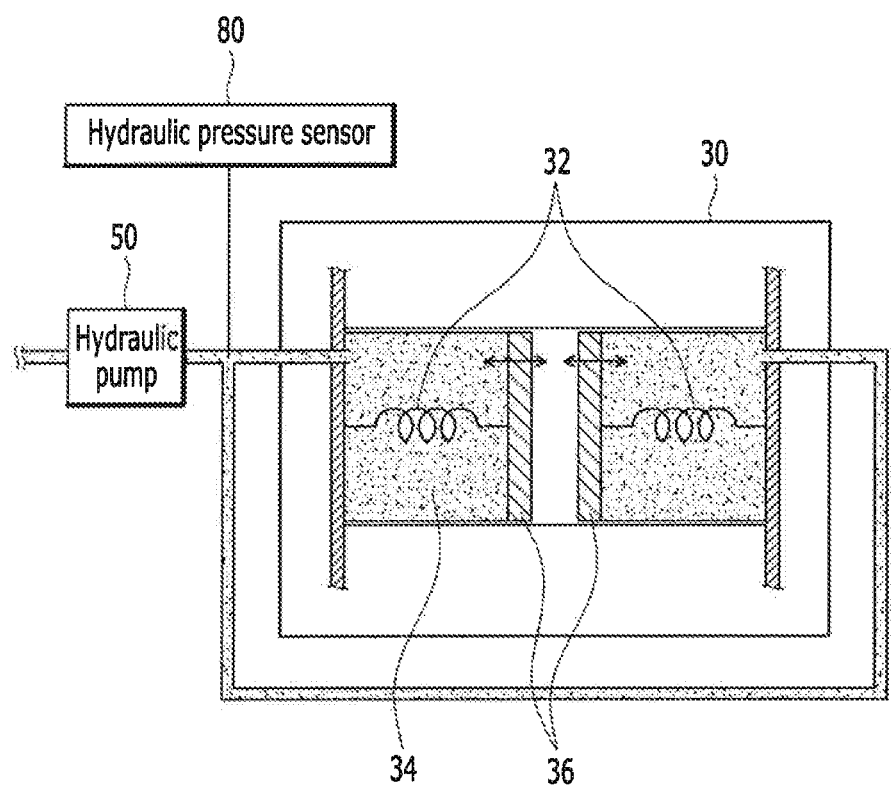
FIG. 2 is a schematic view illustrating a configuration of an example of a related art engine clutch.
Figure 3:
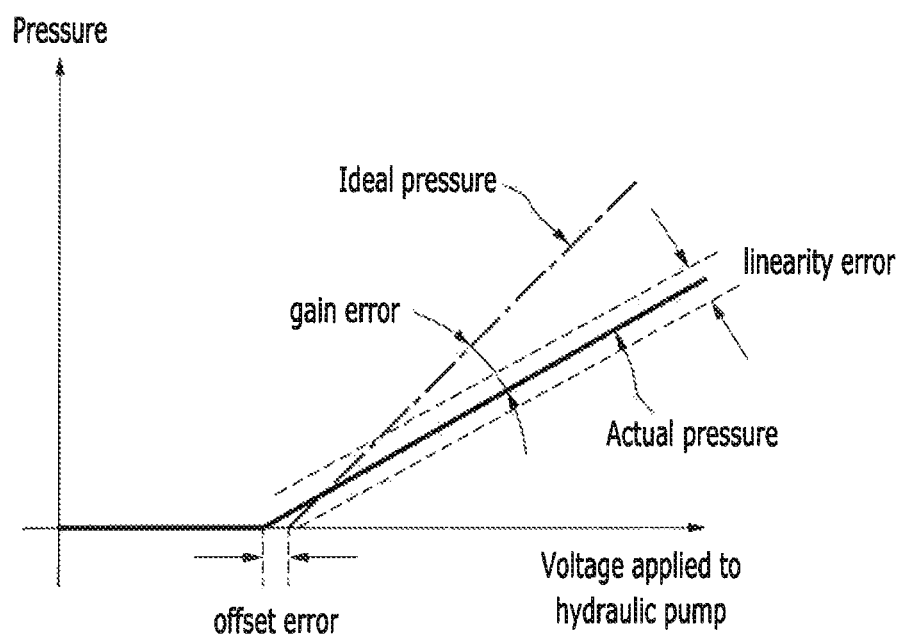
FIG. 3 is a graph showing an error between actual pressure due to voltage applied to a hydraulic oil pump and ideal pressure.

The present invention will be described more fully with reference to the accompanying drawings, in which exemplary embodiments of the invention are shown. However, the present invention is not limited to the exemplary embodiments described herein and may be embodied in other modes.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Like reference numerals are given to like components throughout the specification.

Figure 4:
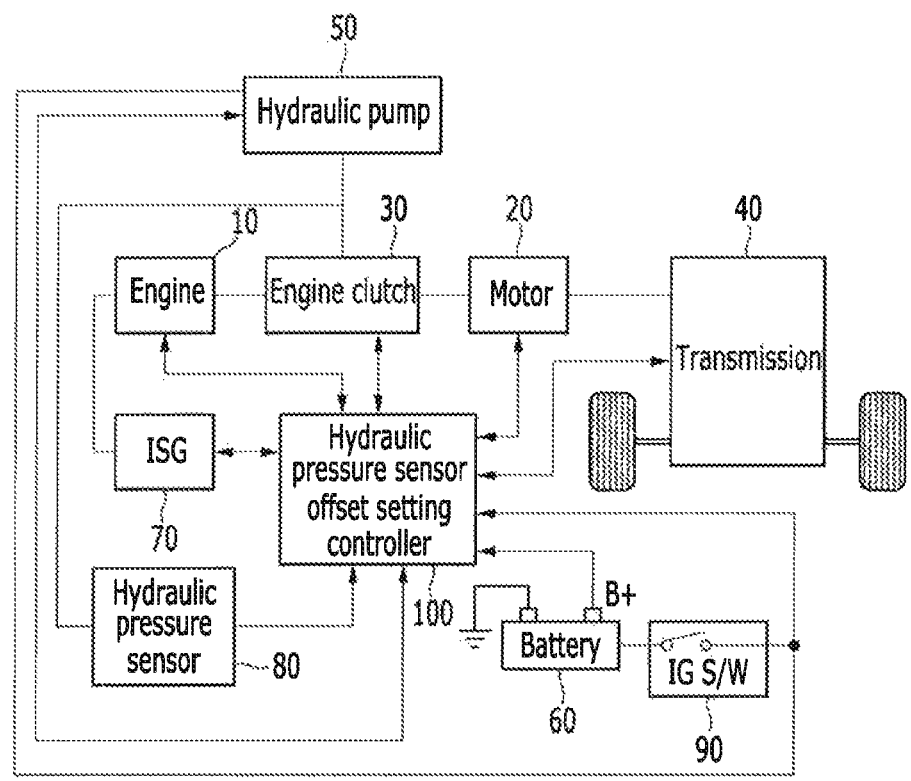
FIG. 4 is a block diagram of a system for setting offset of a hydraulic pressure sensor according to an exemplary embodiment of the present invention.

FIG. 4 is a block diagram illustrating a system for setting an offset of a hydraulic pressure sensor according to an exemplary embodiment of the present invention. Referring to FIG. 4, the system for setting offset of a hydraulic pressure sensor sets an offset in a hydraulic pressure sensor that senses hydraulic operating pressure in an object to be sensed (e.g., a hydraulic clutch or an engine clutch of a hybrid vehicle) which uses hydraulic pressure (oil pressure).

As an example of the object to be sensed using hydraulic pressure (oil pressure) according to the exemplary embodiment of the present invention, the system for setting offset of a hydraulic pressure sensor 80 which senses hydraulic operating pressure in an engine clutch 30 of a hybrid vehicle may include an ignition power source 90 that supplies power in order for the vehicle to run, a hydraulic oil pump 50 that supplies the hydraulic pressure to the engine clutch 30, a battery 60 that provides backup or auxiliary power to the system, and a hydraulic sensor offset setting controller 100 that sets offset of the hydraulic pressure sensor 80 based on the remaining pressure of the engine clutch 30 and a lapse in a time period from ignition-off to ignition-on.

The vehicle in the exemplary embodiment of the present invention may be for example a hybrid vehicle including the engine clutch 30, but it is required to understand that the scope of the present invention is not to be limited as such. An aspect of the present invention can be applied to any vehicle with the hydraulic clutch which uses the hydraulic pressure, even if it is not the hybrid vehicle having the engine clutch 30.

In the exemplary embodiment of the present invention, the hydraulic oil pump 50, the hydraulic pressure sensor 80, the battery 60, and the ignition power source 90 are applied to, for an example, existing hybrid vehicles.

The hydraulic pressure sensor offset setting controller 100 is made up of one or more than one microprocessor or hardware having the microprocessor operable with a predetermined program instructions wherein the program instructions has are made up of a series of instructions for performing a method of setting offset of a hydraulic pressure sensor according to the exemplary embodiment of the present invention, which is to be described below.

In the exemplary embodiment of the present invention, if applied to the hybrid vehicle, the hydraulic pressure sensor offset setting controller 100 may include an HCU (Hybrid Control Unit) for controlling an entire operation of the engine clutch 30 and the hybrid vehicle; and a BMS (Battery Management System) for controlling and managing the battery 60. Alternately, the hydraulic pressure sensor offset setting controller 100 may be included to the HCU or the BMS individually.

In a method of setting offset of a hydraulic pressure sensor according to the exemplary embodiment of the present invention to be described later, some of processes may be performed by the HCU and the other processes may be performed by the BMS.

Figure 5:
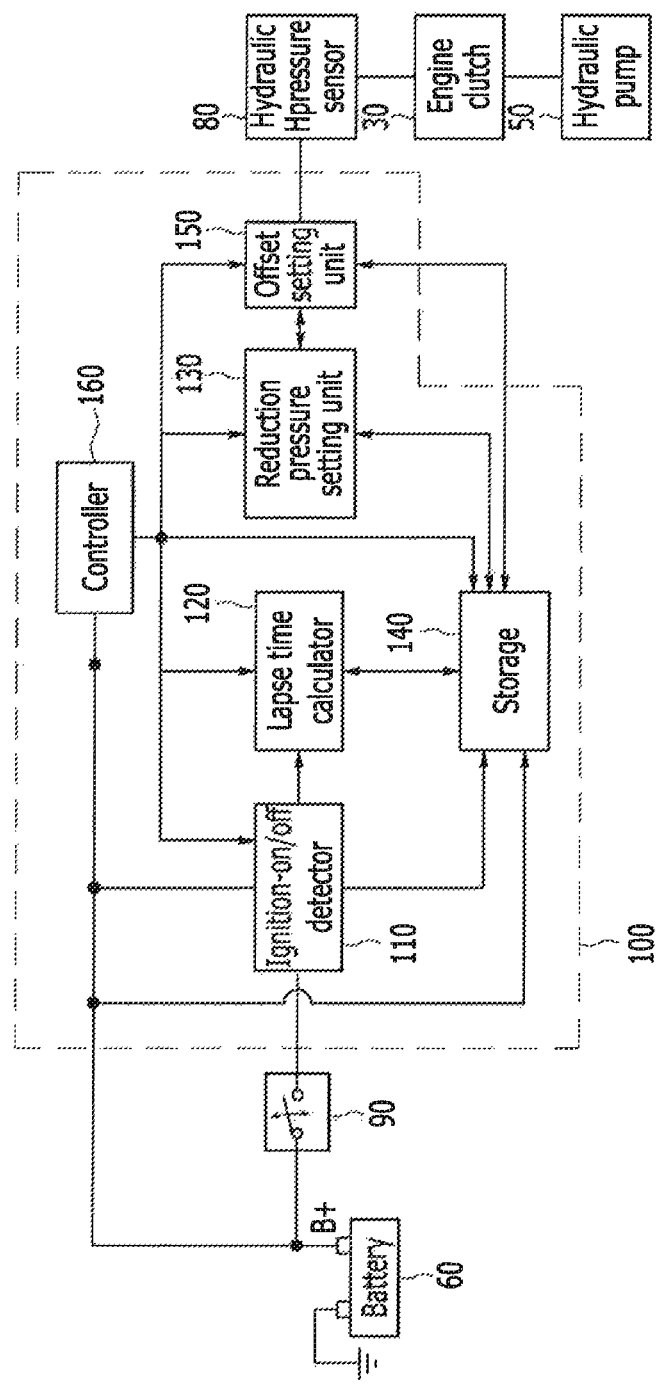
FIG. 5 is a detailed block diagram of an offset setting controller in a system for setting offset of a hydraulic pressure sensor according to an exemplary embodiment of the present invention.

Referring to FIG. 5, the hydraulic pressure sensor offset setting controller 100 may have sub-block elements. The sub-block elements shown in FIG. 5 may be a controller or module having hardware on which programs instructions are installed.

Referring to FIG. 5, the hydraulic pressure sensor offset setting controller 100 may include: an ignition-on/off detector 110 that detects ignition-on or ignition-off; a lapse time calculator 120 that calculates a time lapse from ignition-off to ignition-on; and a storage device 140 that stores a mapping table including the remaining pressure of the engine clutch 30 sensed in ignition-off. In particular, an ignition-off time point and an ignition-on time point detected by the ignition-on/off detector 110, the lapse time calculated by the lapse time calculator 120, and a predetermined pressure reduction amount over a period of time; a reduced pressure calculator 130 that calculates reduced pressure corresponding to the lapse of time based on the pressure reduction amount over a period of time; an offset setting controller 150 for setting offset of the hydraulic pressure sensor 80 based on the reduced pressure and the remaining pressure; and a controller/processor 160 for controlling above.

The storage device 140 may include a non-volatile memory and/or a memory equivalent to the non-volatile memory.

The lapse time calculator 120 may include a timer for calculating the lapse in time. The timer may provide a reference time required for the ignition-on/off detector 110, the reduced pressure calculator 130, the storage device 140, and the offset setting unit 150.

Hereinafter, a method of setting offset of a hydraulic pressure according to the exemplary of the present invention will be described in detail with reference to the accompanying drawings.

In the description of the method of setting offset of a hydraulic pressure according to the exemplary embodiment of the present invention, it is assumed that, though the object to be sensed is the engine clutch of the hybrid vehicle, it is required to understand that the scope of the present invention is not limited to this. An aspect of the present invention may be applied to any hydraulic device which receives hydraulic pressure from a hydraulic oil pump and of which the hydraulic pressure is sensed by a hydraulic pressure sensor, even if it is not an engine clutch.

Figure 6:
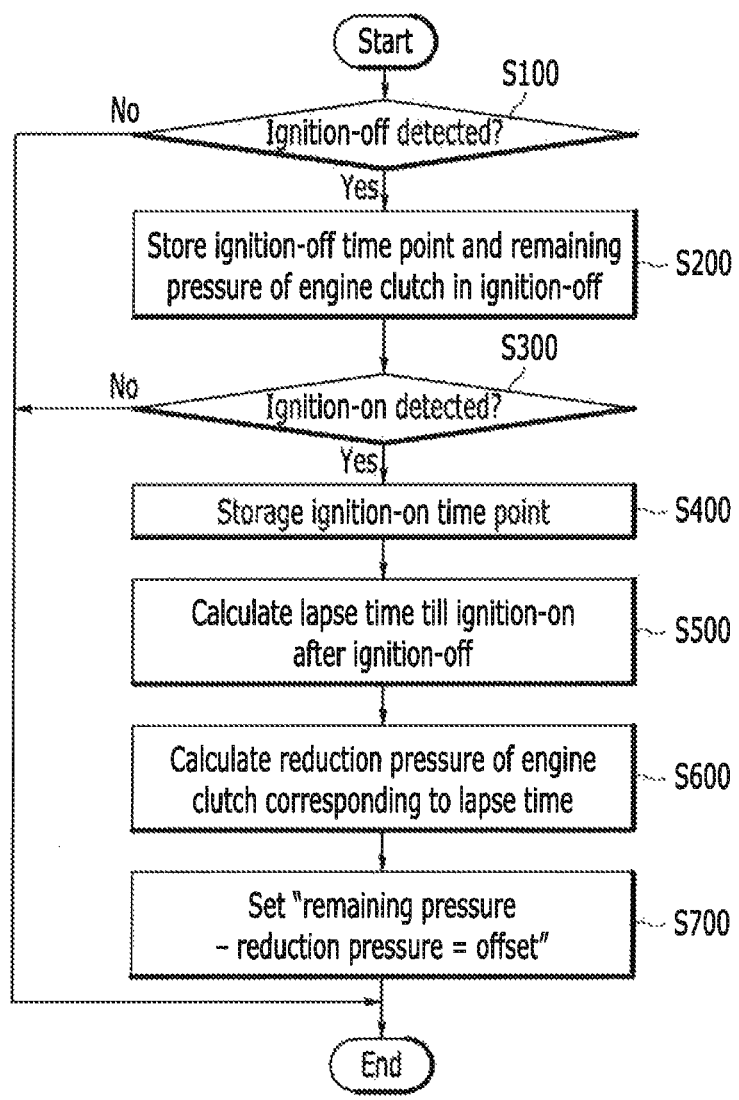
FIG. 6 is a flowchart illustrating the steps of a method of setting offset of a hydraulic pressure sensor according to an exemplary embodiment of the present invention.

FIG. 6 is a flowchart illustrating the steps of a method of setting offset of a hydraulic pressure sensor according to an exemplary embodiment of the present invention. Referring to FIG. 6, the ignition-on/off detector 110 of the hydraulic pressure sensor offset setting controller 100 detects whether ignition is turned off or on (S100). The detection of ignition-off will not be described in detail since the detection of ignition-off can be easily achieved by those skilled in this field of art. Because the ignition-on/off detector 110 of the hydraulic pressure sensor offset setting controller 100 is operated by battery power (B+), the ignition-off time point stored in the ignition-off time point storage device 140 is maintained, even if ignition is turned off.

When ignition-off is detected in S100, the ignition-on/off detector 110 of the hydraulic pressure sensor offset setting controller 100 stores the ignition-off time point and the remaining pressure of the engine clutch 30 sensed by the hydraulic pressure sensor 80 at the ignition-off time point into the storage unit 140 under the control of the controller 160 (S200). The ignition-of/off detector 110 may store the ignition-off point in time and the remaining pressure into a non-volatile memory in the storage device 140 in S200.

After S200, the ignition-on/off detector 110 of the hydraulic pressure sensor offset setting controller 100 detects whether ignition-on is made for running the vehicle or not (S300). When ignition-on is detected in S300, the ignition-on/off detector 110 stores the ignition-on time point into the storage device 140, and preferably, to the non-volatile memory of the storage unit 140 (S400).

When the ignition-on time point is stored in the storage device 140 in S400, the lapse time calculator 120 of the hydraulic pressure sensor offset setting controller 100 calculates the lapse time from the ignition-off time point to the ignition-on time point (S500).

When the lapse time is calculated in S500, the reduced pressure calculator 130 of the hydraulic pressure sensor offset setting controller 100 calculates the reduced pressure corresponding to the lapse time on the basis of the calculated lapse time (S600).

Upon calculating the reduction pressure in S600, the reduced pressure calculator 130 can obtain the reduced pressure by multiplying the pressure reduction amount over a period of time in the mapping table, which is predetermined and stored in the storage device 140, by the lapse in time, but it required to understand that the scope of the present invention is not limited to this.

When the reduced pressure is calculated in S600, the offset setting unit 150 of the hydraulic pressure sensor offset setting controller 100 sets a value obtained by subtracting the reduced pressure calculated in S600 from the remaining pressure of the engine clutch 30 stored in storage device 140 in S200, as the offset of the hydraulic pressure sensor 80 (S700).

Offset of hydraulic pressure sensor=remaining pressure−reduced pressure

Therefore, the method according to the exemplary embodiment of the present invention can stabilize setting of the offset of a hydraulic pressure sensor without being influenced by the soaking time and the remaining pressure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 30: Engine clutch | 50: Hydraulic oil pump |
| 60: Battery | 80: Hydraulic pressure sensor |
| 90: Ignition power source unit | |
| 100: Hydraulic pressure sensor offset setting unit | |
| 110: Ignition on/off detector | 120: Lapse time calculator |
| 130: Reduced pressure calculator | 140: Storage unit |
| 150: Offset setting unit | |

What is claimed is:

1. A method of setting offset of a hydraulic pressure sensor which senses hydraulic pressure of an object to be sensed, the method comprising:
   detecting, by a detector, ignition-off;
   storing, on a storage device, an ignition-off time point and a remaining pressure of the object to be sensed, the remaining pressure being sensed by the hydraulic pressure sensor at the ignition-off time point;
   detecting, by the detector, whether an ignition is turned on after the ignition-off;
   storing, by the storage device, an ignition-on time point, when the ignition-on is detected after the ignition-off;
   calculating, by a processor, a lapse in time between the ignition-on time point and the ignition-off time point;
   obtaining, by the processor, a pressure reduction amount per unit time stored in advance in a mapping table;
   calculating, by the processor, a reduced pressure by multiplying the pressure reduction amount per unit time by the lapse in time; and
   setting and applying, by the processor, a value obtained by subtracting the reduced pressure from the remaining pressure of the hydraulic pressure sensor, as the offset of the hydraulic pressure sensor.

2. The method of claim 1, wherein the pressure reduction amount over the period of time is stored in a mapping table, which is predetermined and stored in advance.

3. The method of claim 1, wherein the ignition-off time point is stored in a non-volatile memory by using battery power.

4. The method of claim 1, wherein the object to be sensed is an engine clutch which connects/disconnects power between an engine and a motor in a hybrid vehicle.

5. A hydraulic pressure sensor offset setting controller being operably connected to a hydraulic pressure sensor which senses hydraulic pressure of an object to be sensed, the hydraulic pressure sensor offset setting controller comprising:
   the hydraulic pressure sensor offset setting controller configured to set offset of the hydraulic pressure sensor based on a remaining pressure of the object to be sensed and a lapse in time from ignition-off to ignition-on,
   wherein the hydraulic pressure sensor offset setting controller is operated by a program instruction configured to set an offset of the hydraulic pressure sensor by detecting ignition-off; storing an ignition-off time point and remaining pressure of the object to be sensed, the remaining pressure being sensed by the hydraulic pressure sensor at the ignition-off time point; detecting whether the ignition has been turned on or not after the ignition-off; storing an ignition-on time point, when the ignition-on is detected after the ignition-off; calculating a lapse in time between ignition-on and the ignition-off time point; obtaining a pressure reduction amount per unit time stored in advance in a mapping table; calculating a reduced pressure by multiplying the pressure reduction amount per unit time by the lapse in time; and setting and applying a value obtained by subtracting the reduced pressure from the remaining pressure of the hydraulic pressure sensor, as the offset of the hydraulic pressure sensor.

6. The hydraulic pressure sensor offset setting controller of claim 5, wherein
   the hydraulic pressure sensor offset setting controller further comprises:
   an ignition-on/off detector configured to detect ignition-on or ignition-off;
   a lapse time calculator configured to calculate the lapse time to ignition-on from ignition-off;
   a storage device that stores a mapping table including the remaining pressure of the object to be sensed in ignition-off, an ignition-off time point and an ignition-on time point detected by the ignition-on/off detector, the lapse time calculated by the lapse time calculator, and a predetermined pressure reduction amount per a time period;
   a reduced pressure calculator configured to calculate the reduced pressure corresponding to the lapse in time based on the pressure reduction amount over the period of time;
   an offset setting unit configured to set the offset of the hydraulic pressure sensor based on the reduced pressure and the remaining pressure; and
   a processor configured to control the offset setting unit, the reduced pressure calculator, the ignition-on/off detector, a lapse time calculator, and a storage device.

7. The hydraulic pressure sensor offset setting controller of claim 6, wherein the object to be sensed is an engine clutch that connects/disconnects power between an engine and a motor in a hybrid vehicle.

8. A non-transitory computer readable medium containing program instructions executed by a processor or controller, the computer readable medium comprising:
   program instructions that detect an ignition-off;

program instructions that store an ignition-off time point and remaining pressure of an object to be sensed, a remaining pressure being sensed by a hydraulic pressure sensor at the ignition-off time point;

program instructions that detect whether an ignition is turned on or not after the ignition-off;

program instructions that store an ignition-on time point, when the ignition-on is detected after the ignition-off;

program instructions that calculate a lapse in time between the ignition-on time point and the ignition-off time point;

program instructions that obtain a pressure reduction amount per unit time stored in advance in a mapping table;

program instructions that calculate a reduced pressure by multiplying the pressure reduction amount per unit time by the lapse in time; and program instructions that set and apply a value obtained by subtracting the reduced pressure from the remaining pressure of the hydraulic pressure sensor, as the offset of the hydraulic pressure sensor.

\* \* \* \* \*